A. G. BETTS.
METALLURGICAL PROCESS.
APPLICATION FILED NOV. 30, 1906.
938,634.
Patented Nov. 2, 1909.
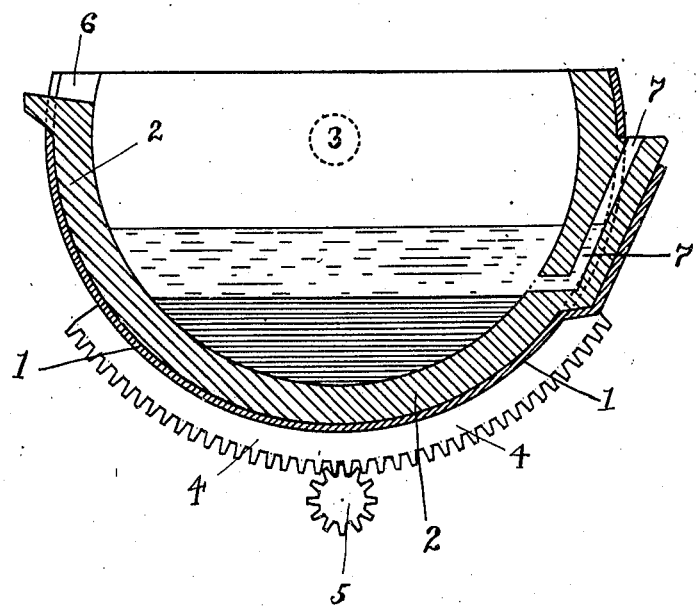
WITNESSES
Ralph H. Shury
Benj Starbuck
INVENTOR
Anson Gardner Betts

UNITED STATES PATENT OFFICE.

ANSON GARDNER BETTS, OF TROY, NEW YORK.

METALLURGICAL PROCESS.

938,634.

Specification of Letters Patent. Patented Nov. 2, 1909.

Application filed November 30, 1906. Serial No. 345,774.

*To all whom it may concern:*

Be it known that I, ANSON GARDNER BETTS, a citizen of the United States, residing at Troy, in the county of Rensselaer and State of New York, have invented certain new and useful Improvements in Metallurgical Processes, of which the following is a specification accompanied by a drawing.

The single figure of the drawing shows apparatus which I may use in carrying out my invention.

This process relates to the metallurgy of aluminum, and in its preferred form to the metallurgy of iron.

The principal object of the invention is to prepare pure aluminum cheaply from common raw materials, and in its preferred form it is also an object of the invention to cheaply prepare metals, especially iron, from their sulfids.

Other objects will appear in connection with the following description of my method.

To carry out my invention I reduce aluminum ore by any suitable means in presence of a comparatively easily reduced and relatively not very volatile metal, or compound of such metal, producing thereby an alloy of aluminum and such other metal. Aluminum has a considerable combining power with iron and with copper, for instance, and as a result aluminum is more readily reduced in presence of these metals. If such metals are present in the furnace charge as ores, they are so much more readily reduced than aluminum that their partial reduction at least takes place before any aluminum is reduced so that in any event the reduction of aluminum takes place in the presence of such other metal.

There are certain well-known electrical methods for making ferro-aluminum and aluminum bronze by the reduction of alumina in presence of iron and copper respectively, and any such methods may be used in carrying out this invention, but I regard the reduction in the following manner as being more economical and better adapted for a large production of aluminum.

Iron ore and aluminum ore, *e. g.*, bauxite or kaolin, are charged with fuel in a blast furnace similar to an iron blast furnace, differing from an iron blast furnace however in action, in that a higher temperature is used in the smelting section of the furnace. The higher temperature may be produced by using a more highly heated blast, but especially well by blowing the furnace with air from which some of the nitrogen has been removed such a gaseous mixture may be produced by liquefaction and fractionation of air.

In an iron furnace little or no aluminum is reduced with the iron, but a fair amount of silicon is formed. In smelting for iron-aluminum alloys practically all the silicon present is reduced, and as silica is always a constituent of both iron and aluminum ores, the product is not ferro-aluminum, but iron-aluminum-silicon. The most readily oxidized, sulfurized, chloridized etc., metal of the iron-aluminum-silicon, aluminum bronze etc., being aluminum, the aluminum may be removed therefrom as pure aluminum compound by treatment with suitable oxidizing, sulfurizing and chloridizing reagents. Thus treatment of iron-aluminum-silicon with silica at high temperatures gives a slag of pure alumina and ferro-silicon.

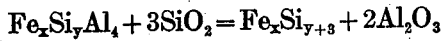

$$Fe_xSi_yAl_4 + 3SiO_2 = Fe_xSi_{y+3} + 2Al_2O_3$$

or treatment of iron-aluminum-silicon with iron ore gives, at high temperatures, pure fused alumina and ferro-silicon, provided the iron ore is free from lime, magnesia, etc., otherwise the lime, magnesia, etc., will contaminate the alumina. The alumina produced may be utilized in the production of pure aluminum by the well-known methods. I prefer however to treat the aluminum alloy with a sulfurizing agent, especially with a metallic sulfid as sulfid of iron, nickel, copper, etc., thereby producing aluminum sulfid which I electrolyze for metallic aluminum, while the metal of the sulfid is reduced.

The sense in which I use the term metal or iron in the claims, as being part of the furnace charge smelted to aluminum alloy, is that the metal, or specifically iron, may be present either in the combined or elemental state. The result is substantially the same, as the metal, or iron, referred to, being more reducible than aluminum, is reduced first.

The aluminum sulfid is more readily and cheaply reduced to aluminum than the oxid is, and furthermore certain metallic sulfids occur as ores or intermediate smelting products and are relatively much cheaper than the contained metal and sulfur, both of which I am able to save by this procedure.

I especially prefer the use of iron sulfid, because it can be easily procured in large quantities, and so far no economical process has been devised, as far as I am aware, to recover both the iron and sulfur thereof.

The reaction between aluminum alloys and iron sulfid is approximately

As examples of the use of other sulfids than that of iron, I mention the preparation of ferro-nickel or nickel steel by reacting on ferro-aluminum with nickel sulfid

the preparation of silicon bronze by reacting on an alloy of copper, aluminum and silicon resulting from the reduction of kaolin in presence of copper, with copper sulfid

Numerous other alloys containing iron, nickel or cobalt, and copper may be made in analogous ways, and mixed sulfids may be used also in place of the simple sulfids, for example a mixture of iron and nickel sulfids in the preparation of nickel-iron alloys, and the use of a mixture of nickel and copper sulfids in the manufacture of alloys containing copper and nickel, as German silver. The sulfids should be brought together with the alloys containing aluminum, with both sulfid and alloy in the fused condition, and this may conveniently be done without its being necessary to especially fuse the alloy and sulfid, as both are produced as a result of smelting operations, and may be brought together for reaction directly after tapping from the respective smelting furnaces.

Sulfid of iron occurs in nature in quantity in a fairly pure condition as pyrrhotite and pyrite, but even in this case I prefer to run the sulfid through a furnace with suitable additions to flux off the gangue, for the double purpose of getting rid of the gangue and for heating the sulfid.

When pyrite is smelted, I contemplate being able to increase the yield of sulfid by adding iron oxid to the charge to carry out these reactions:

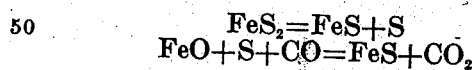

that is to say, the first reaction is the decomposition of the pyrites by heat into ferrous sulfid and sulfur. The liberated sulfur acting on iron oxid in presence of carbon or carbon monoxid produces a further quantity of iron sulfid.

Inasmuch as any iron, copper and nickel sulfids which are not decomposed by aluminum, and remaining in the aluminum sulfid produced, would either necessitate a special purification of the aluminum sulfid therefrom before electrolyzing the aluminum sulfid for aluminum and sulfur, or would cause the production of aluminum contaminated with respectively iron copper or nickel, it is better to use an excess of aluminum in carrying out the reaction, so that the end products of the reaction are aluminum sulfid substantially free from the sulfids of more readily reducible metals, and an alloy still containing some aluminum, which aluminum may be readily removed by oxidizing agents if desired.

To insure the reaction taking place to be as complete as possible it is preferred to carry out the reaction in two stages. The alloy is first treated with an insufficient quantity of iron sulfid, etc., to react with the aluminum present, resulting in practically pure aluminum sulfid. The alloy still containing considerable aluminum is then treated with excess of iron sulfid, forming a matte containing both iron and aluminum sulfid, which matte is then used alone or together with fresh iron sulfid in the next treatment of aluminum alloy. This is illustrated in connection with the accompanying drawing in which I have shown a crucible in which I may carry out my process.

The crucible consists of an iron shell 1, lined with suitable refractory material 2. The shell is supported on trunnions one of which 3 is indicated by dotted lines. The crucible can be tilted either way by means of a gear 4, and spur 5 driven from a suitable source of power not shown. The crucible has a spout 6 for fused sulfid and a spout 7 for metal.

A cycle of operations is as follows. The crucible contains to begin with a fused mixture of iron and aluminum sulfids for example from a previous operation. Fused iron-aluminum-silicon is run in, when a reaction takes place, a large part of the aluminum of the alloy becoming aluminum sulfid while iron is reduced from the matte. The fused aluminum sulfid is then poured off by tilting the crucible so that it may run out of the spout 6 into suitable receptacles or electrolytic furnaces not shown. The crucible is then tilted back to the original position and fused ferrous sulfid added. The products are fused aluminum-iron sulfid, and iron alloy containing considerably less aluminum than it did originally. The alloy, ferro-silicon, is then poured out at the spout 6 by tilting the crucible the other way, leaving the fused sulfid mixture in the crucible, to take part in the next cycle of operations.

In case the iron sulfid used to react with the alloy containing aluminum, carries copper or other valuable metals, I contemplate removing the copper, etc., as bottoms or metal by suitable methods, before bringing the iron sulfid and the aluminum-containing alloy together.

In carrying out the reaction between the aluminum-containing alloy to produce aluminum compound practically free from metals more readily reduced, the use of suitable fluxes for the aluminum compound formed is permissible, for instance cryolite is used as flux. Furthermore such flux may be previously treated in the molten condition with aluminum ore, bauxite for example, when on interaction with aluminum-containing alloy, the impurities, iron and silicon principally, are reduced, while the contained alumina remains and becomes available for the production of pure aluminum.

What I claim as new and desire to secure by Letters Patent, is,—

1. The process of making aluminum which consists in reducing aluminum oxid in presence of other suitable less-reactive metal, producing thereby an alloy of aluminum with a less-reactive metal, reacting on the alloy with a suitable material capable of producing therewith an aluminum compound practically free from compounds of more readily-reducible metals than aluminum, and reducing aluminum from said aluminum compound.

2. The process of making aluminum which consists in reducing aluminum oxid in presence of other suitable less reactive metal, producing thereby an alloy of aluminum with a less-reactive metal, reacting on the alloy with a suitable metallic compound capable of reacting therewith to produce an aluminum compound practically free from compounds of less reactive metals, and reducing aluminum from said aluminum compound.

3. The process of making aluminum which consists in reducing aluminum ore in presence of a suitable heavy metal, producing a heavy metal-aluminum alloy, reacting on the alloy with a metallic sulfid capable of reacting with aluminum, thereby producing aluminum sulfid, and reducing aluminum from the said aluminum sulfid.

4. The process of making aluminum which consists in reducing aluminum oxid in presence of a suitable heavy metal, producing a heavy metal-aluminum alloy, reacting on the alloy with iron sulfid, thereby producing aluminum sulfid, and reducing aluminum from the said aluminum sulfid.

5. The process of producing aluminum which consists in smelting ore or earthy material containing iron and aluminum, producing thereby an alloy containing iron and aluminum, treating the fused alloy with fused iron sulfid, thereby producing aluminum sulfid, and reducing aluminum from said sulfid.

6. The process of making aluminum which consists in reducing aluminum ore in presence of iron to an alloy containing iron and aluminum, reacting on the alloy with iron sulfid, thereby reducing iron and making aluminum sulfid, and decomposing the aluminum sulfid electrolytically into aluminum and sulfur.

7. The process of making aluminum which consists in reducing aluminum ore or oxid in the presence of a more readily reducible metal to an alloy of aluminum and such metal, treating said sulfid with said alloy, thereby recovering metal from said sulfid, and producing aluminum sulfid, and decomposing said sulfid electrolytically into aluminum and sulfur.

In testimony whereof I have signed my name to this specification this 27th day of November, 1906, in the presence of two subscribing witnesses.

ANSON GARDNER BETTS.

Witnesses:
BENJAMIN STARBUCK,
RALPH H. SHERRY.